(12) United States Patent
Northrop

(10) Patent No.: US 7,958,844 B1
(45) Date of Patent: Jun. 14, 2011

(54) CONTINUOUS FLOW PET WATERING DEVICE

(75) Inventor: Melaney Northrop, Mansfield, TX (US)

(73) Assignee: Doskocil Manufacturing Company, Inc., Arlington, TX (US)

( * ) Notice: Subject to any disclaimer, the term of this patent is extended or adjusted under 35 U.S.C. 154(b) by 152 days.

(21) Appl. No.: 12/360,412

(22) Filed: Jan. 27, 2009

(51) Int. Cl.
*A01K 7/00* (2006.01)
(52) U.S. Cl. .......................................... 119/74
(58) Field of Classification Search .............. 119/72, 119/74, 61.5, 57.92, 51.2, 702, 225; 239/16–18, 239/21, 24; 472/117; 40/406, 407; 4/496
See application file for complete search history.

(56) References Cited

U.S. PATENT DOCUMENTS

| | | |
|---|---|---|
| 3,112,733 A | 12/1963 | Arnott |
| 3,720,184 A | 3/1973 | Pearce |
| 3,804,064 A * | 4/1974 | Kuneman et al. ............. 119/246 |
| 3,901,439 A | 8/1975 | Willis |
| 4,248,177 A | 2/1981 | Peterson et al. |
| 4,584,966 A | 4/1986 | Moore |
| 4,721,063 A | 1/1988 | Atchley |
| 4,747,538 A | 5/1988 | Dunn et al. |
| 4,819,874 A | 4/1989 | Geiger |
| 4,836,142 A | 6/1989 | Duback |
| 4,836,144 A | 6/1989 | Cole |
| 4,924,812 A | 5/1990 | Bernays, Jr. |
| 4,976,220 A | 12/1990 | Gershman |
| D315,037 S | 2/1991 | Clark |
| 5,138,980 A | 8/1992 | Ewing |
| D330,098 S | 10/1992 | VanSkiver |
| 5,167,368 A | 12/1992 | Nash |
| 5,259,336 A | 11/1993 | Clark |
| 5,326,032 A | 7/1994 | Quillin |
| D350,841 S | 9/1994 | VanSkiver |
| D350,842 S | 9/1994 | VanSkiver |
| D351,689 S | 10/1994 | VanSkiver |
| 5,467,735 A | 11/1995 | Chrisco |
| D364,942 S | 12/1995 | VanSkiver et al. |
| 5,478,281 A * | 12/1995 | Forton .......................... 472/117 |
| D367,735 S | 3/1996 | VanSkiver et al. |
| 5,501,178 A | 3/1996 | Kemp |
| D374,109 S | 9/1996 | Lillelund et al. |
| 5,743,210 A | 4/1998 | Lampe |
| 5,799,609 A | 9/1998 | Burns et al. |
| 5,842,437 A | 12/1998 | Burns |
| 5,842,442 A | 12/1998 | Marr |
| 5,845,600 A | 12/1998 | Mendes |
| D405,560 S | 2/1999 | Chrisco |
| D406,924 S | 3/1999 | Kolozsvari |
| D406,926 S | 3/1999 | Kolozsvari |
| 6,044,797 A | 4/2000 | Leason et al. |
| 6,055,932 A | 5/2000 | Weber |
| 6,055,934 A * | 5/2000 | Burns et al. ..................... 119/74 |
| 6,079,361 A | 6/2000 | Bowell et al. |
| 6,079,951 A | 6/2000 | Morton |

(Continued)

*Primary Examiner* — Rob Swiatek
*Assistant Examiner* — Ebony Evans
(74) *Attorney, Agent, or Firm* — Dorsey & Whitney LLP

(57) ABSTRACT

A pet watering device includes a bowl having a base with an upwardly extending sidewall attached to the base. A ramp is disposed within the bowl and extends from the bowl sidewall to the base. The ramp includes an aperture for dispensing water. A pump is disposed within the bowl. A lift tube is disposed between the pump and the ramp aperture for transporting water, such that the pump removes water from the bowl to the lift tube for discharge through the ramp aperture onto the ramp for return of water to the bowl.

18 Claims, 3 Drawing Sheets

U.S. PATENT DOCUMENTS

| | | | |
|---|---|---|---|
| D428,217 S * | 7/2000 | Rodack et al. | D30/132 |
| 6,101,974 A | 8/2000 | Frohlich | |
| D432,279 S | 10/2000 | Kim | |
| 6,142,099 A | 11/2000 | Lange, Jr. | |
| D446,889 S | 8/2001 | Bornhofen | |
| D456,569 S | 4/2002 | Northrop | |
| 6,378,460 B1 | 4/2002 | Skurdalsvold et al. | |
| D457,275 S | 5/2002 | Skurdalsvold et al. | |
| D457,692 S | 5/2002 | Skurdalsvold et al. | |
| 6,460,483 B1 * | 10/2002 | Northrop et al. | 119/74 |
| 6,467,428 B1 | 10/2002 | Andrisin et al. | |
| 6,477,981 B1 | 11/2002 | Harper | |
| D472,350 S | 3/2003 | Northrop et al. | |
| 6,526,916 B1 | 3/2003 | Perlsweig | |
| 6,527,257 B1 | 3/2003 | Schuld | |
| 6,582,315 B1 * | 6/2003 | Formanski | 472/117 |
| 6,622,657 B2 * | 9/2003 | Northrop et al. | 119/74 |
| 6,640,747 B2 | 11/2003 | Reusche | |
| 6,789,503 B1 | 9/2004 | Gao | |
| D497,041 S | 10/2004 | Plant | |
| 6,928,954 B2 | 8/2005 | Krishnamurthy | |
| D514,751 S | 2/2006 | Plante | |
| 7,040,249 B1 | 5/2006 | Mushen | |
| 7,089,881 B2 | 8/2006 | Plante | |
| 7,264,176 B2 | 9/2007 | Johnson | |
| 7,270,082 B2 | 9/2007 | Plante | |
| D552,802 S | 10/2007 | Kuster | |
| 7,281,494 B1 | 10/2007 | Connerley | |
| D563,605 S | 3/2008 | Morris et al. | |
| 7,341,203 B1 | 3/2008 | Yeomans et al. | |
| 2002/0189548 A1 | 12/2002 | Northrop et al. | |
| 2004/0118356 A1 | 6/2004 | Krishnamurthy | |
| 2005/0166853 A1 | 8/2005 | Plante | |
| 2006/0011528 A1 | 1/2006 | Ireland | |
| 2006/0174838 A1 | 8/2006 | Plante | |
| 2006/0230676 A1 * | 10/2006 | Rowe et al. | 47/66.6 |
| 2006/0288947 A1 | 12/2006 | Perlsweig et al. | |
| 2007/0095297 A1 | 5/2007 | Boyd | |
| 2008/0078330 A1 | 4/2008 | McCallum et al. | |

* cited by examiner

CONTINUOUS FLOW PET WATERING DEVICE

TECHNICAL FIELD OF THE INVENTION

The present invention relates to pet watering devices, and more particularly to a continuous flow watering device for pets whereby water is circulated to provide continuous running water for pets.

BACKGROUND OF THE INVENTION

Pet watering devices create flowing water to attract pets as well as to provide recirculation of the water to maintain a fresh supply of water for pets to drink. The re-circulating water can be filtered to remove debris from the water as well as reduces the growth of bacteria and fungus.

A need has arisen for a pet watering device that creates a continuous flow of water to attract pets to drink water as well as to provide a debris and bacteria free source of drinking water for pets.

SUMMARY OF THE INVENTION

In accordance with the present invention, a pet watering device is provided. The watering device includes a bowl having a base with an upwardly extending sidewall attached to the base. A ramp is disposed within the bowl and extends from the bowl sidewall to the base. The ramp includes an aperture for dispensing water. A pump is disposed within the bowl. A lift tube is disposed between the pump and the ramp aperture for transporting water, such that the pump removes water from the bowl to the lift tube for discharge through the ramp aperture onto the ramp for return of water to the bowl.

BRIEF DESCRIPTION OF THE DRAWINGS

For a more complete understanding of the present invention and for further advantages thereof, reference is now made to the following description of the preferred embodiments taken in conjunction with the accompanying drawings in which.

DESCRIPTION OF THE PREFERRED EMBODIMENTS

Figure 1:
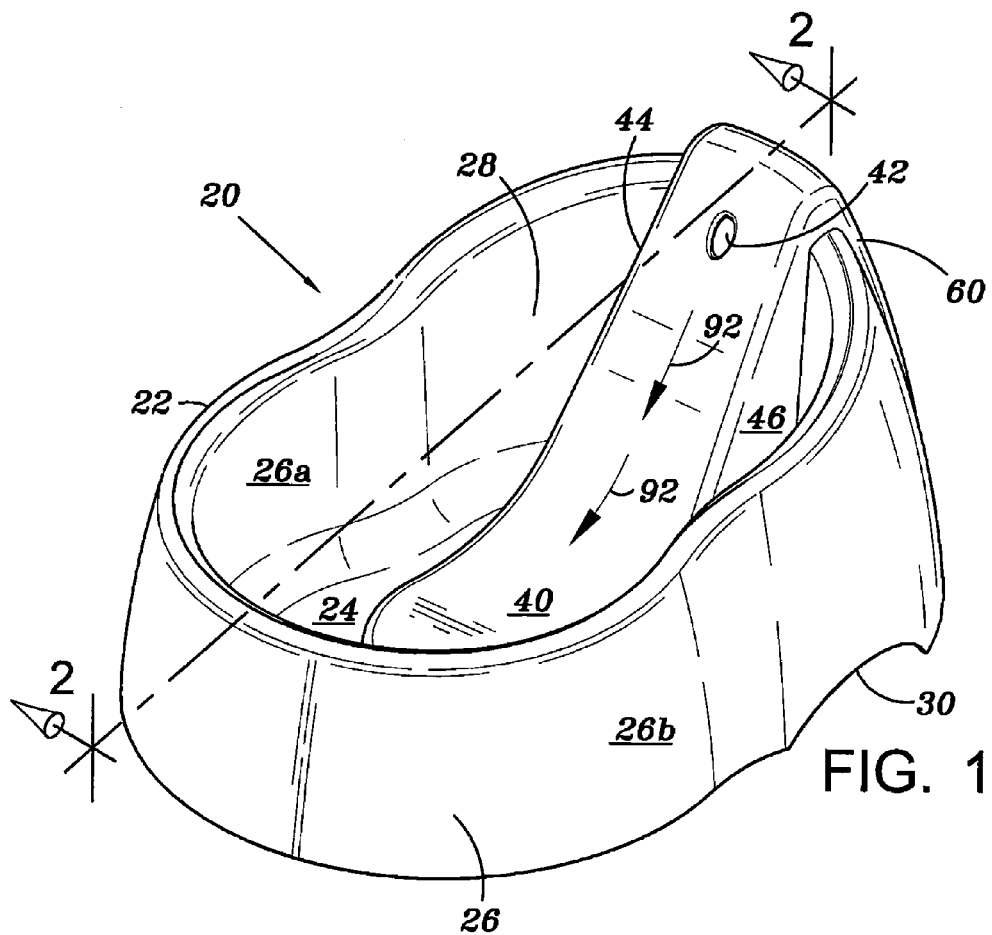
FIG. 1 is a perspective view of the present watering device.
Figure 2:
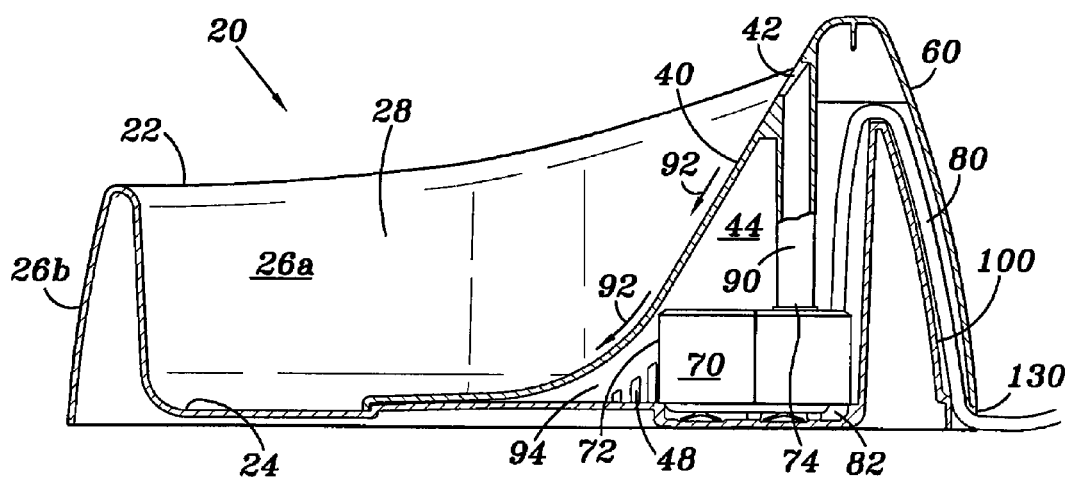
FIG. 2 is a sectional view taken generally along sectional lines 2-2 of FIG. 1.

Referring simultaneously to FIGS. 1 and 2, the present pet watering device is illustrated, and is generally identified by the numeral 20. Watering device 20 includes a bowl 22 having a base 24. Extending upwardly from base 24 is a sidewall 26 surrounding base 24 and creating an open top 28 for bowl 22 to allow pets to drink from bowl 22. Sidewall 26 includes an inner surface 26a and an outer surface 26b.

Sidewall 26 includes handles 30 and 32 (FIG. 4) formed adjacent base 24 of bowl 22 which allow fingers of a user to be inserted below base 24 for lifting and carrying device 20.

Disposed within bowl 22 of device 20 is a ramp 40. Ramp 40 extends from bowl 22 sidewall inner surface 26a to bowl 22 base 24. Water is dispensed into bowl 22 via ramp 40 through an aperture 42. Ramp 40 includes sidewalls 44 and 46. Ramp sidewalls 44 and 46 include slots 48 and 50, respectively.

Ramp 40 is mounted to outer surface 26b of sidewall 26 utilizing a bracket 60. Bracket 60 is integrally connected to ramp 40, and as illustrated in FIG. 2 extends from the top to the bottom of bowl 22. Ramp 40 is selectively connectable to bowl 22 utilizing bracket 60, such that ramp 40 can be easily removed from bowl 22 for cleaning and refilling of bowl 22.

Figure 3:
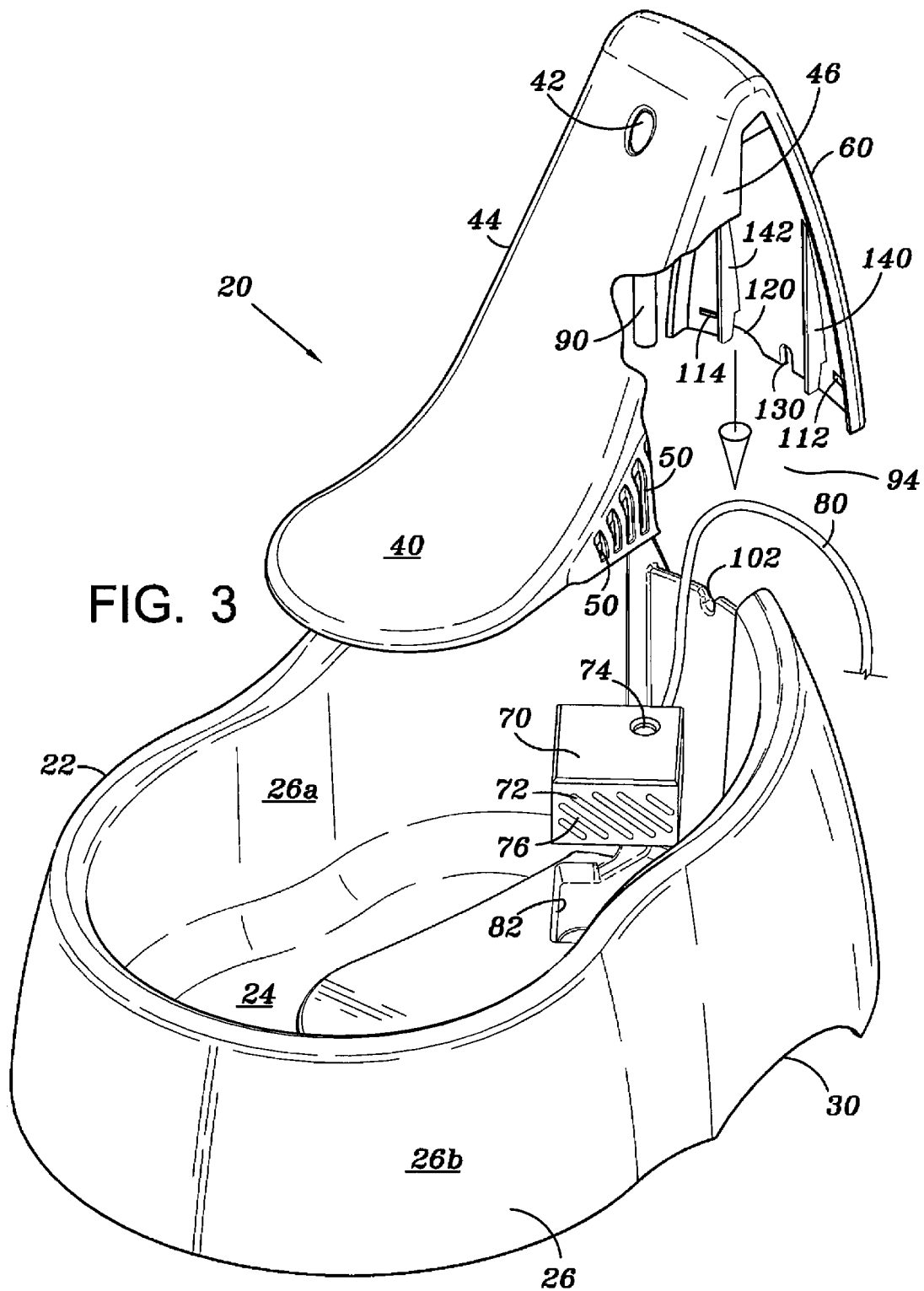
FIG. 3 is a front exploded perspective view.

Referring to FIGS. 2 and 3, pet watering device 20 includes a submersible pump 70. Pump 70 has an intake suction port 72 and a discharge port 74. Unfiltered water is drawn into pump 70 via port 72. Filtered water is dispensed from pump 70 via discharge port 74. Suction port 72 includes a filter 74. Pump 70 receives a supply of electrical power via a power cord 80 which is powered from a household AC electricity supply or portable batteries.

Pump 70 is disposed in a recess 82 (FIG. 3) positioned in base 24 of bowl 22.

Referring to FIGS. 2 and 3, integrally interconnected to ramp 40 is a lift tube 90 positioned below aperture 42 of ramp 40. Lift tube 90 is selectively interconnected to port 74 of pump 70. Lift tube 90 operates to transport water from pump 70 to ramp 40 to return filtered and re-circulated water from bowl 22 back into bowl 22 via ramp 40. Water flows down ramp 40 in the direction of arrows 92.

The recirculation of water within bowl 22 through sidewalls 44 and 46 of ramp 40 via slots 48 and 50 into port 72, output from port 74 of pump 70 into lift tube 90 and then discharged through aperture 42 of ramp 40 provides a continuous flow of water to maintain a fresh supply of water for pets to drink as well as to reduce the growth of bacteria and fungus. The stream of water flowing on ramp 40 in the direction of arrows 92 not only attracts pets to watering device 20, but also disturbs the surface tension of water in bowl 22 to inhibit bacteria and fungus growth.

Sidewalls 44 and 46 of ramp 40 together with base 24 and inner surface 26a of sidewall 26 form an enclosure 94 for pump 70. Enclosure 94 prevents a pet from contacting pump 70. Additionally, debris within bowl 22 passing through slots 48 and 50 of sidewalls 44 and 46 of ramp 40 is captured and trapped within enclosure 94 to allow for the accumulation of large particles, such as food, to accumulate under ramp 40 and to be separated from the drinking area of bowl 22.

Figure 4:
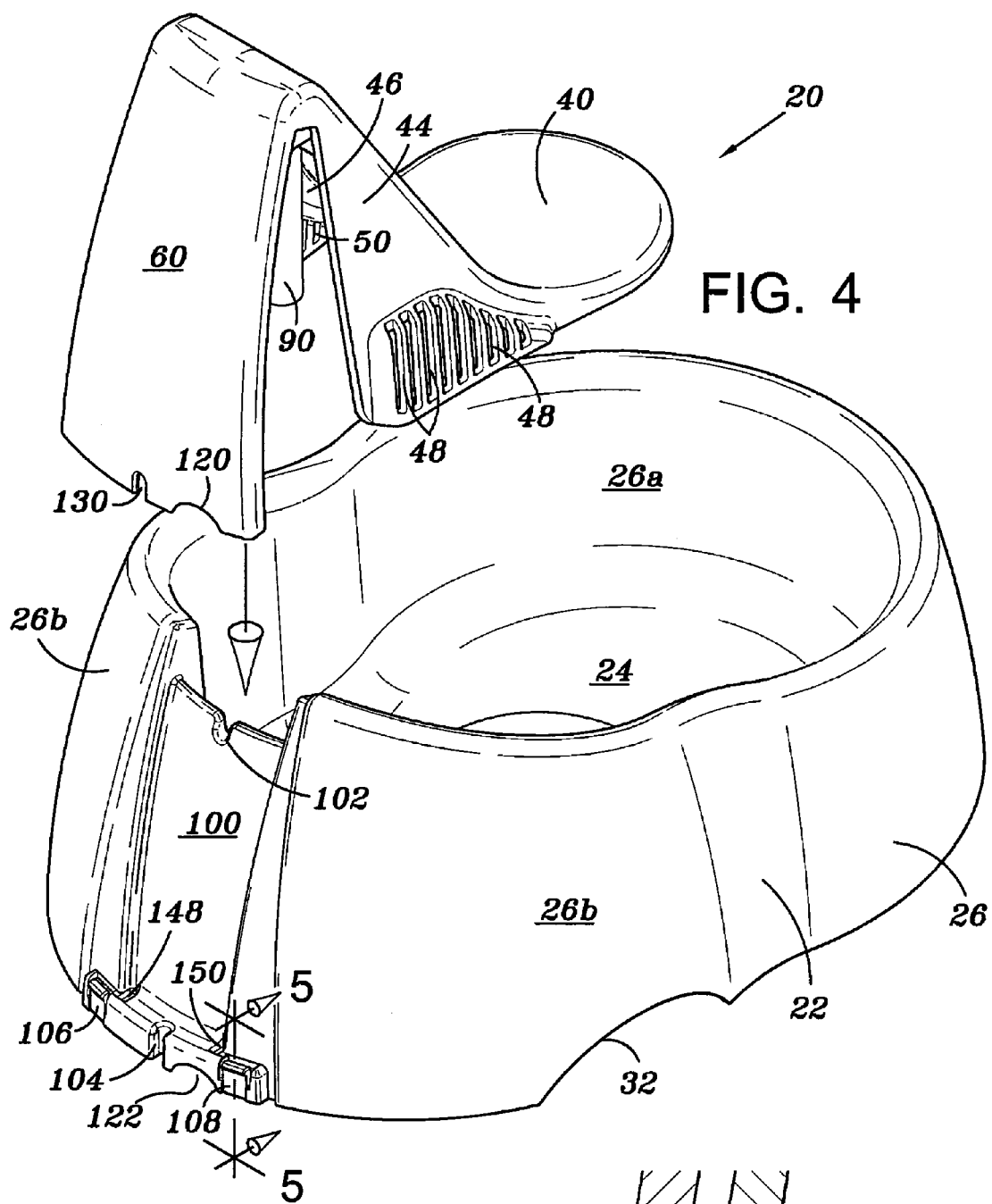
FIG. 4 is a rear exploded perspective view.

Referring now to FIGS. 3 and 4, the mounting of bracket 60 to bowl 22 will now be described. Outer surface 26b of sidewall 26 includes a recess 100. Recess 100 extends from top to bottom of bowl 22. Recess 100 together with bracket 60 forms a housing for power cord 80. Power cord 80 is retained within a slot 102 at the top of recess 100 and slot 104 at the bottom of bowl 22.

Figure 5:
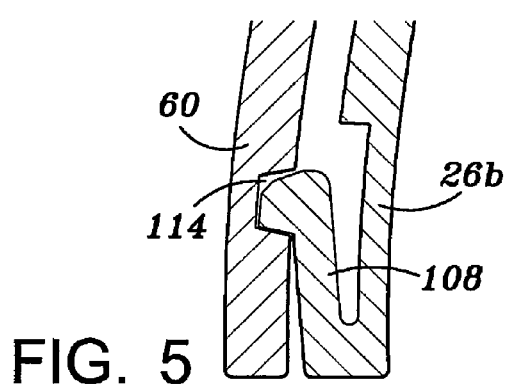
FIG. 5 is a sectional view taken generally along sectional lines 5-5 of FIG. 4.

Outer surface 26b of sidewall 26 includes mounting tabs 106 and 108 which selectively engage recesses 112 and 114, respectively, contained within bracket 60. Tabs 106 and 108 snap into recesses 112 and 114 to mount bracket 60 to bowl 22 (FIG. 5).

Bracket 60 includes a half circle aperture 120 which aligns with a half circle aperture 122 within sidewall 26 which allows access of a user's finger to disengage tabs 106 and 108 from recesses 112 and 114 to permit removal of bracket 60 to thereby remove ramp 40 from bowl 22.

Power cord 80 is received within a slot 130 within bracket 60.

In order to assist in the mounting of bracket 60 to bowl 22, bracket 60 includes ribs 140 and 142 (FIG. 3) whose ends engage apertures 148 and 150, respectively, within sidewall 26, in order to align bracket 60 to recess 100.

The invention claimed is:

1. A pet watering device, comprising:
a bowl, said bowl having a base, an upwardly extending sidewall attached to said base and an open top to allow pets to drink from said bowl, said sidewall having an inner surface and an outer surface;
a ramp disposed within said bowl and extending from said bowl sidewall to said bowl base, said ramp having an aperture for dispensing water a mounting bracket attached to said ramp selectively mounting said ramp to said bowl sidewall outer surface;
a pump disposed within said bowl, said pump having a suction port and a discharge port; and
a lift tube disposed between said pump discharge port and said ramp aperture for transporting water, such that said pump removes water from said bowl to said lift tube for discharge through said ramp aperture onto said ramp for return of water to said bowl.

2. The device of claim 1 wherein said ramp includes sidewalls extending between said bowl sidewall inner surface and said bowl base to form an enclosure for said pump.

3. The device of claim 2 wherein said lift tube is disposed within said pump enclosure.

4. The device of claim 2 wherein said pump enclosure forms a debris trap for capturing debris from within said bowl.

5. The device of claim 2 and further including a filter disposed within said pump enclosure and adjacent said pump suction port.

6. The device of claim 1 wherein said pump includes a power cord, and
said power cord being disposed between said mounting bracket and said bowl sidewall such that said mounting bracket houses said power cord.

7. The device of claim 1 wherein said mounting bracket extends along said outer surface of said bowl sidewall.

8. The device of claim 7 wherein said pump includes a power cord, and
said power cord being disposed between said mounting bracket and said bowl outer surface such that said mounting bracket houses said power cord.

9. The device of claim 1 wherein said bowl base includes a recess for receiving and mounting said pump to said base.

10. The device of claim 1 wherein said lift tube is integrally connected to said ramp.

11. The device of claim 1 wherein said mounting bracket includes a recess and said bowl sidewall outer surface includes a mounting tab for selectively engaging said mounting bracket recess for attaching said mounting bracket to said bowl sidewall.

12. The device of claim 11 wherein said bracket includes a cut out to allow a user's finger to disengage said mounting tab from said mounting bracket recess for removal of said ramp from said bowl.

13. The device of claim 12 wherein said ramp includes sidewalls extending between said bowl sidewall inner surface and said bowl base to form an enclosure for said pump.

14. The device of claim 13 wherein said pump enclosure forms a debris trap for capturing debris from within said bowl.

15. The device of claim 14 wherein said ramp sidewalls include apertures through which water flows from said bowl to said pump suction port.

16. The device of claim 15 wherein said mounting bracket includes a rib and said bowl sidewall includes an aperture for receiving said rib for aligning said mounting bracket for attachment to said bowl sidewall.

17. The device of claim 16 wherein said pump includes a power cord, said power cord being disposed between said mounting bracket and said bowl sidewall outer surface, such that said mounting bracket houses said power cord.

18. The device of claim 17 and further including a filter disposed within said pump enclosure and adjacent said pump suction port.

* * * * *